May 18, 1965     H. E. STORR     3,184,523
GRANULATION OF IRON
Filed Aug. 16, 1961     4 Sheets-Sheet 2
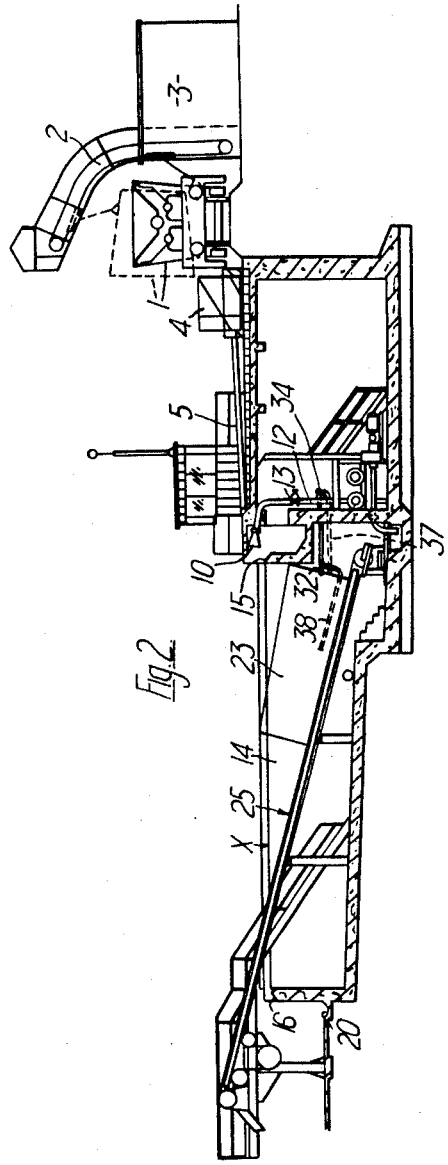
Inventor
HARDY ERIC STORR
By
Mason, Fenwick & Lawrence
Attorneys

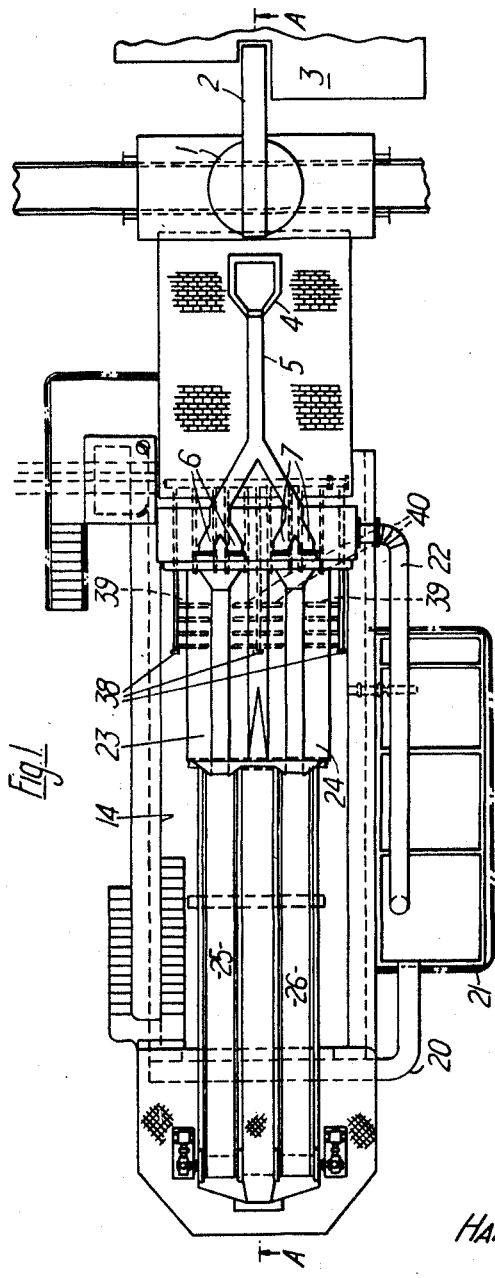
Inventor
HARDY ERIC STORR

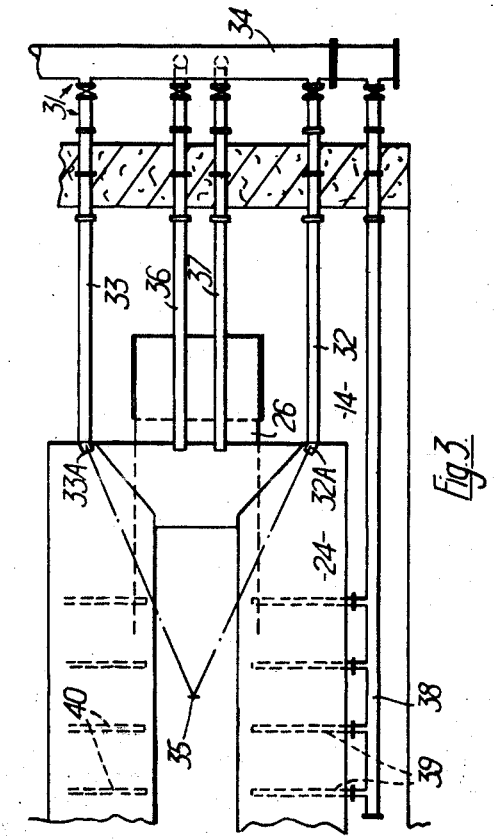

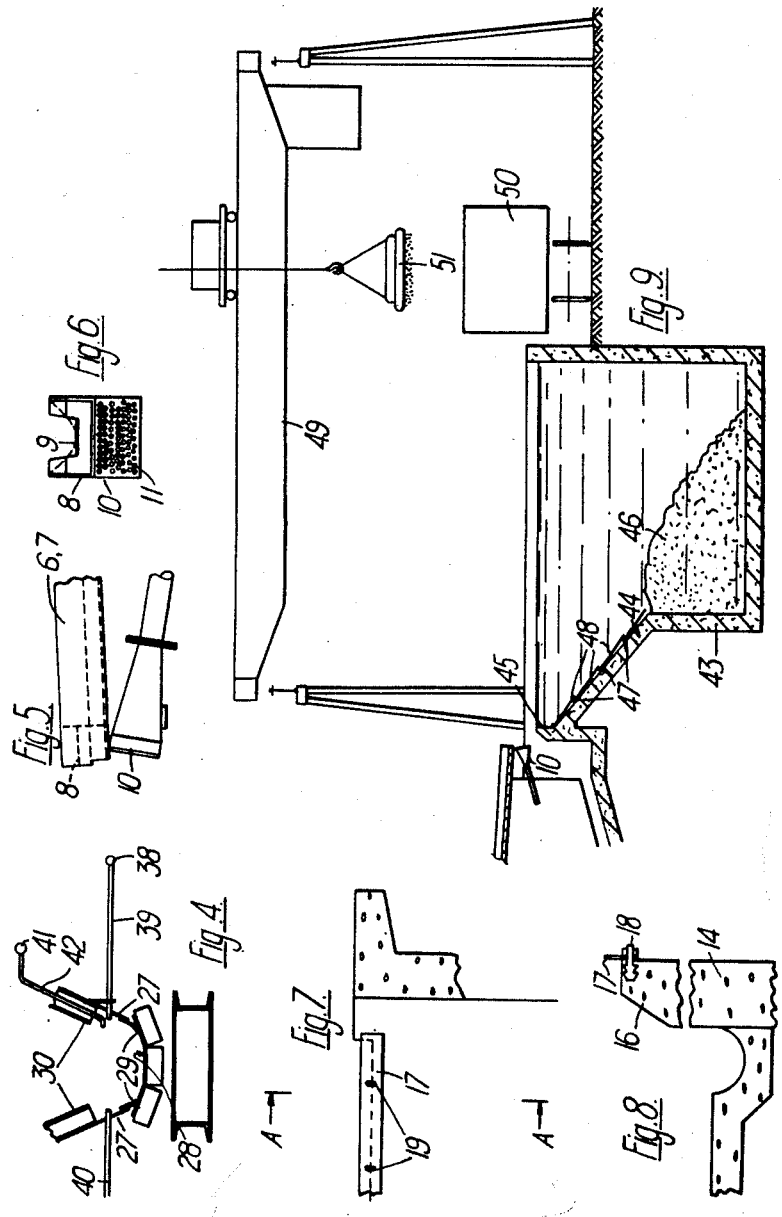

3,184,523
GRANULATION OF IRON
Hardy Eric Storr, Northampton, England, assignor to Stewarts and Lloyds Limited, Glasgow, Scotland, a British company
Filed Aug. 16, 1961, Ser. No. 131,801
Claims priority, application Great Britain, Aug. 16, 1960, 28,287/60
2 Claims. (Cl. 264—5)

This invention relates to the granulation of iron by a method comprising directing a stream of molten iron through the atmosphere, subjecting the molten iron stream to the action of jets of water to create a shower of hot iron particles and water, and collecting the falling shower in a vessel containing water through which the particles of the shower sink.

The object of the invention is to produce iron granules which are of a desirable shape for their use in the iron and steel industry, for easy bulk handling e.g. by conveyor belt, and for ease of flow in bulk e.g. down chutes and through bin gates.

It has been discovered that treating the molten iron with high-temperature water in the jets and in the vessel instead of with chilling water results in a granule of a desirable smoothly contoured, or rounded or globular shape.

It would appear that the resulting protection afforded against chilling during fall, and the relatively slow cooling together ensure that the granule remains plastic or molten sufficiently long for surface tension forces to act on it and give it a smoothly contoured or rounded or globular form. Possibly the high-temperature jet water contributes to the instant formation of an insulating layer of steam around the granule and this layer permits some spherodising of the granule to occur over the short time space involved in the fall through atmosphere.

A method embodying the invention will now be described, by way of example, with reference to the accompanying diagrammatic drawings in which:

FIG. 1 is a top plan view of one form of iron-granulating apparatus for use in carrying out the method.

FIG. 2 is a sectional elevation on the line A—A of FIG. 1.

FIG. 3 is a fragmentary top plan view of supply means for cooling water, the piping being symmetrical about the longitudinal centre lines of the hoppers.

FIG. 4 is a transverse sectional view at the bottom of the collecting vessel.

FIGS. 5 and 6 are respectively side and end views of a metal runner and its spray head.

FIGS. 7 and 8 are respectively a front view and a transverse sectional view of a weir on the collecting vessel.

FIG. 9 is a sectional elevation of another form of iron-granulating apparatus.

Referring to the drawings:

In FIGS. 1 to 8, pig-iron from a blast furnace is poured into a tipping ladle 1 which an electrical hoisting winch 2 controlled from a control room 3 causes to tip gently and regularly. The winch 2 is equipped with variable speed driving motor and gear to ensure a constant rate of iron discharge at all levels of metal in the ladle, and a quick return of the empty ladle to receiving position. The ladle discharges the molten iron into a container or surge pool 4 with side walls funneled towards an opening through which the metal passes into the top end of a downwardly sloped sand-lined conduit 5 which divides to form pairs of sand-lined branch conduits 6 and 7. At the bottom end of each branch conduit 6, 7 is mounted a block 8 of refractory material preferably carbon, of appropriate size and shape controlling the flow of molten iron from the branch conduit. The molten iron flows in the form of a wide ribbon 9 from the bottom end of the branch conduit and falls in a wide ribbon through the atmosphere.

Immediately below the bottom end of each branch conduit 6, 7 is a water-jet or spray head 10 containing a plurality of jet openings 11 which direct the water outwards in substantially horizontal streams. Assuming the falling molten metal ribbons to be nearly vertical, the water jets from the heads impinge on the ribbons at approximately right angles. The water jets break up the ribbons into particles and spread the particles horizontally in showers. The jet heads 10 are fed with hot water from a suitable source by a high-pressure pump (not shown), and the flow of hot, pressure water to each jet head is through a pipe 12 and a valve 13. The temperature of the hot-water jets is in the range 60° C.–70° C.

The showers of hot metal particles produced by the hot-water jets fall into a tank 14 of water which is maintained at a high temperature, in the range 80° C. to 95° C., but not above 95° C. as the tank contents might then erupt. The desired level X of hot water in the tank 14 is maintained by two weirs 15 and 16 at opposite ends of the tank. The weir 16 includes a plate 17 secured to the weir wall by bolts 18 extending through vertical slots 19 in the plate which is thus vertically adjustable to vary the weir level. A channel 20 delivers the overflow to a settling tank 21 from which the water is discharged to waste through a pipe 22. A pair of collecting hoppers 23 and 24 submerged in the tank 14 and associated respectively with conduit pairs 6 and 7, receive the particles as they sink through the water. The hoppers have open bottoms which are aligned with the upper runs of a pair of upwardly sloped endless-belt conveyors 25 and 26 so that the particles fall through the hoppers on to the coveyors. The side walls 27 (FIG. 4) of each hopper 23, 24 terminate closely adjacent to the edges of its conveyor's upper run 28, and rubber sealing strips 29 secured to the lower ends of the side walls frictionally engage the top face of the upper run 28 to prevent lateral spilling of the particles from the conveyor. Each hopper has internal louvre plates 30 spaced from the side plates 27 to define upwardly extending passages for the escape of hot water upwards from the region of the conveyor so that there is free circulation of the water in the hopper.

Supply piping 31 (FIG. 3) for cooling water extends from a source of cooling water into the hoppers 23, 24 and discharges at a location below water level and above the submerged upper run of the conveyor. One or more of the following three piping arrangements are provided for the hopper:

(1) At each hopper, a pair of parallel longitudinal valve-controlled supply pipes 32, 33 communicate with a transverse manifold pipe 34 at the end of the tank adjacent to the nozzles, and cold water is supplied from a source to the pipe 34 by a pump. The discharge ends 32A, 33A of the pipes 32, 33 converge to direct convergent streams of cooling water towards a zone 35 which is about midway of the hopper depth and at the end of the hopper adjacent to the nozzles, and through which the heavy iron particles sink.

(2) At each hopper, a pair of parallel, valve-controlled supply pipes 36 and 37 open from the manifold pipe 34 and discharge parallel jets of cooling water into the hopper 24 to form a cooling zone immediately above the conveyor.

(3) For serving both hoppers, three parallel, valve-controlled supply pipes 38 communicate with the manifold pipe 34 and slope upwards alongside the exterior of the hopper side walls. Opposed series of branch pipes 39 and 40 project through the hopper side walls to discharge into the hoppers at locations immediately above the conveyors. In an alternative shown in FIG. 4, supply pipes 41 have branch pipes 42 extending downwards behind the louvre plates 39 and discharging immediately above the conveyor.

The addition of the cooling water to the tank can be varied to suit variations in the temperature of the tank water arising during operation of the apparatus, such temperature variations being noted for instance by continuous temperature recording. Thus, the cooling water is used to prevent the tank water from becoming too hot (the temperature must not exceed 95° C.), and also to provide a cooling zone midway of the hopper depth and/or immediately above the conveyor, and at the end of the hopper adjacent to the nozzles, so that the heavier particles sinking through the zones are cooled sufficiently to prevent burning of the belt.

The conveyors 25, 26 are motor-driven through variable-speed gearing, so that the speed of passage through the water of the particles on the submerged conveyor runs is closely regulable.

By controlling the flow of cooling water and/or the speed of the conveyors, it is possible to control the cooling of the granules and so ensure that sufficient heat is retained by the granules leaving the tank to dry the granules in the course of subsequent handling.

As the metal granules settling on the submerged conveyors retain some of their heat, the conveyor belts are made of a heat-resistant material e.g., a suitable rubber, or steel of a special woven mesh construction.

The granules are delivered by the conveyors 25, 26 clear of the tank, into suitable equipment for road or rail loading, or for direct belt feeding to storage bins or for stacking on the ground.

While a variety of designs of jet heads are possible, good results are obtained with jet heads each containing 7 horizontal rows of ½" diameter jet holes, the rows comprising alternately 13 and 12 jet holes. Said jet heads operate at 7 lbs./in.$^2$ measured in line 4 feet from the heads. For this particular condition, the ribbon of molten iron is 6½ inches wide and ⅜ inch thick, but larger ribbon widths are used in larger capacity plants. The hoppers are at least 11 ft. deep to give sufficient depth and reserve of water to accommodate the high water temperatures.

In operation of the apparatus, to obtain a product of high bulk density and large average particle size, the temperature of the molten iron ribbon is maintained as high as possible, and the flow rate of the molten iron is reduced somewhat if there is any fall in the iron temperature. Thus, with molten iron at 1300° C., a minimum flow rate of molten iron of about 0.22 ton/minute per 1 inch width of ribbons produces spherical particles of about 0.32 inch diameter and with a bulk density of about 270 lbs./cu. ft. With molten iron at 1150° C., this flow rate requires reduction to the order of 0.195 ton/min./inch.

FIG. 9 shows a simplification of the apparatus. The hot shower of metal particles formed by the hot-water jets from head 10, falls into a hot-water tank 43 made of concrete and having an internal face 44 sloped downwards and inwards from an overflow rim portion 45 located under the head 10. Thus the granulated metal tends to slide down said face 44 and collect in a heap 46 on the bottom of the tank 43. Piping 47 distributed over the inclined face 44 and protected by plating 48 covering the face, has jet openings therein for discharging controlled amounts of cooling water from a source into the tank to maintain the hot tank water at the desired temperature.

The granules are lifted from the tank in batches, that is, non-continuously by a grab (not shown) which is supported by a travelling crane 49 and deposits the granules in a vehicle 50.

Alternatively, the grab is replaced by an electromagnet 51, in which event the tank 43 consists of a pair of side-by-side compartments (not shown) usable alternately to enable preliminary drainage of water from the compartment to be emptied by the electromagnet.

It is found that the hot-water treatment of the molten metal results in a smoothly contoured, rounded or globular granule which lends itself to easy bulk handling, whereas the cold-water treatment of the molten metal results in a granule which is ragged and angular in contour.

Moreover, in one example the hot-water product has a bulk density of 289 lbs./cu. ft. as against only 230 lbs./cu. ft. for the cold-water product.

Also, surprisingly, the screen size of the hot-water granules is generally larger than that of the cold-water granules with respect to passage through a sieve; and the hot-water granules are more uniform in size than the cold-water granules.

This invention is also applicable to the treatment of molten slag, and in the following claims the term "iron" is for convenience used to mean iron or slag.

I claim:
1. A method of granulating iron comprising directing a stream of molten iron through the atmosphere, subjecting the molten iron stream to the action of jets of water to create a shower of hot iron particles and water, and collecting the falling shower in a vessel containing water through which the particles of the shower sink, wherein the water of the jets is at a temperature in the range 60° C. to 70° C., and the water in the vessel is maintained at a temperature in the range 80° C. to 95° C., so that the particles from the moment they are created are protected against chilling and cool slowly to form smoothly contoured or rounded or globular granules.

2. A method of granulating iron comprising directing a stream of molten iron through the atmosphere, subjecting the molten iron stream to the action of jets of water to create a shower of hot iron particles and water, and collecting the falling shower in a vessel containing water through which the particles of the shower sink, wherein the water of the jets is at a temperature in the range 60° C. to 70° C., and the water in the vessel is maintained at a temperature in the range 80° C. to 95° C., so that the particles at the moment of their creation are each coated with hot jet water which is instantly converted to steam enshrouding the particle to protect same against chilling by the atmosphere and so maintain same molten during the fall thereof through the atmosphere, and the sinking particles cool slowly, the protection against chilling and the slow cooling together ensuring formation of smoothly contoured or rounded or globular granules.

References Cited by the Examiner

UNITED STATES PATENTS

| | | | |
|---|---|---|---|
| 1,886,285 | 11/32 | Martin | 264—11 |
| 2,384,892 | 9/45 | Comstock | 18—47.3 |
| 2,561,862 | 7/51 | Hill | 75—0.5 |
| 2,787,534 | 4/57 | Golwynne | 75—0.5 |
| 2,863,790 | 12/58 | Chen | 264—5 XR |
| 2,892,215 | 6/59 | Naeser et al. | 18—47.3 |
| 2,956,304 | 10/60 | Batten et al. | 18—2.5 |
| 2,965,922 | 12/60 | Toulmin | 18—2.5 |
| 3,009,205 | 11/61 | Monson et al. | 18—47.3 |

FOREIGN PATENTS

| | | |
|---|---|---|
| 800,070 | 8/58 | Great Britain. |

ALEXANDER H. BRODMERKEL, *Primary Examiner.*

MARCUS U. LYONS, RAY K. WINDHAM, *Examiners.*